Nov. 4, 1930.　　J. M. MAYHALL ET AL　　1,780,598
LIQUID MEASURING DEVICE
Filed April 29, 1927
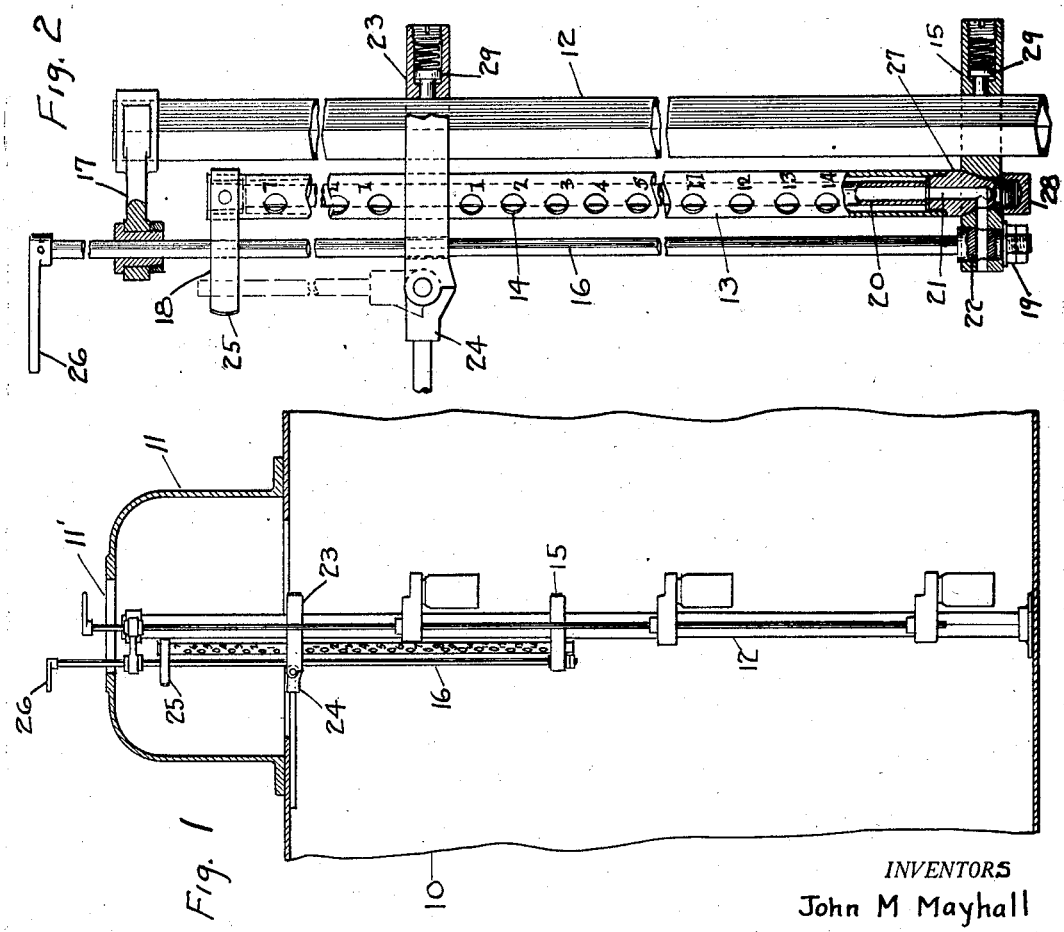
INVENTORS
John M Mayhall
Howard C. Morrison
BY
Erwin, Wheeler & Woolard
ATTORNEYS.

Patented Nov. 4, 1930

1,780,598

UNITED STATES PATENT OFFICE

JOHN M. MAYHALL AND HOWARD C. MORRISON, OF MILWAUKEE, WISCONSIN

LIQUID-MEASURING DEVICE

Application filed April 29, 1927. Serial No. 187,518.

Our invention relates to a device designed especially for the purpose of determining the domage and ullage of tank cars, used in the transportation of oils, gasoline, and similar liquids.

Such a car when filled at the refinery at a given temperature, will contain a stated number of thousands of gallons of fluid content. But when shipped to its destination, the bulk thereof may show considerable variation, due to any one or several causes. Lower temperatures will lessen the volume, while higher temperatures will have an opposite effect. The conditions existing at the place of shipment are compared with those at the destination by the consignee, with due allowance for variations of bulk due to the differences in such conditions, and in this manner the consignee ascertains the quantity received by him. Both domage and ullage may be attributed wholly to different temperatures.

Our invention is embodied in a simply constructed device which will accurately indicate variation from the normal due to either factor. It resides in a portable device which may be easily inserted into the tank through the dome of the latter, and correctly indicate the shrinkage or expansion of the liquid content of the tank. It consists of an attachment to the device set forth in our prior application filed October 4, 1926, Serial No. 139,373, for liquid testing devices, such attachment comprising a feeler which is engageable with the inner wall of the tank at the top thereof and at the foot of the dome, and a vertically arranged glass tube, into which the liquid is permitted to rise upon opening a valve at the lower end, so that the level of the liquid in the tank will be shown in the tube, and the extent of the variation above or below normal shown upon a scale associated with the tube.

The measuring device is adjustable to accommodate its use to tanks of different capacities.

Having thus outlined the nature and purposes of the invention, we will now describe the same particularly, and point out the novelty thereof in the appended claims.

In the accompanying drawing:

Figure 1 is a vertical longitudinal section through the dome and central portion of the tank of a railway car, showing our invention in position for use.

Fig. 2 is an enlarged view showing the device in side elevation.

In the drawing, the numeral 10 indicates the shell of a tank car or other container adapted to the transportation or storage of oil or its derivatives, the said tank being provided with a dome 11 having an inlet or manhole 11'.

The numeral 12 indicates a staff, preferably constituted as a light metal tube, of suitable length to enable it when inserted in the tank to rest upon the bottom thereof, and to extend upwardly to a point near the inlet to the dome. A metal tube 13 provided with graduated sight openings 14 is supported at its lower end in vertical parallelism with the staff 12 by means of a sliding or otherwise adjustable bracket 15 on the staff 12. A lifting rod 16, also employed to operate the valve in the manner hereinafter described, is connected at its lower end to the bracket 15, and guided at its upper end in a bracket 17, attached to the staff 12. A lateral support 18 for the upper end of the perforated tube 13, and attached thereto, embraces the lifting rod 16. The lower end of the rod 16 is threaded, and nuts 19 are applied thereto at the under side of the bracket 15, so that a longitudinal movement of the rod 16 will move the bracket 15 and the perforated tube 13 in the same direction.

Arranged inside of the perforated tube 13 is glass tube 20, properly packed at its lower end to prevent leakage. From the lower end of the glass tube 20, leads a duct 21, opening outwardly from the end of the bracket 15. The upper end of the tube 20 is opened to the atmosphere. The lower end of the rod 16 is enlarged and tapered as at 22, so as to work in a tapering opening formed vertically in the end of the bracket 15, the tapered and enlarged end 22 being bored transversely to form a passage which may be aligned with the duct 21, through which the liquid may flow into the glass tube 20. When the perforated tube 13 is moved downwardly along the staff 12 by pressure exerted upon the rod 16, the bracket 15 is likewise moved. The perforated tube and its contained glass tube, as well as the bracket 15 in which is the valve controlling the flow into the tube, may therefore be moved either up or down on the staff 12, to adjust the measuring device to the desired altitude.

A bracket 23, sliding on the staff 12, is attached to the perforated tube 13 at a point intermediate the ends of the latter, so as to maintain a neutral or zero position from which the graduations on the perforated tube lead in either direction. Pivoted to the bracket 23 is an arm 24, which is adapted to be folded into an inoperative position parallel with the rod 16, as shown by the dotted lines in Fig. 2, and to be held in such position by a friction clamp 25 on the lateral support 18, when the device is not in use. The said arm 24 is adapted to be turned into horizontal position, and brought into engagement with the inside upper part of the shell 10 of the tank, by a lifting movement on the rod 16. With the lower end of the staff 12 resting upon the bottom of the tank, and the arm 24 in engagement with the shell as described, the zero point of the scale is precisely in line with the under side of the upper part of the shell at the highest point of the latter.

In operation, the device has been passed through the manhole and positioned as described. The valve in the bracket 15 will now be opened by turning the rod 16 through the radial lever or handle 26 affixed to the upper end of the rod, and the liquid will flow through the said valve and into the glass tube 20, attaining the level of the liquid in the tank, be it either above or below the zero line. By a reverse movement of the handle 26, the valve will be closed, and the device withdrawn. The liquid in the glass tube 20 may be visualized through the openings in the protecting tube 13, and if standing above the zero point, will indicate the extent of the domage. If the liquid in the tube stands below the point, it will indicate the ullage or shrinkage. Upon ascertaining these factors, the actual cubical contents of the tank may be accurately determined, after due consideration by the consignee of the conditions which may cause variation in the volume of the liquid content of the car.

In the construction illustrated, the lower end of the tube 13 is threaded upon the end of a bored stud 27 set into the bracket 15 and held thereon by a nut 28 threaded upon its other end. But the stud 27 may be formed as a projection upon the bracket. The brackets 15 and 23 may be provided with spring-pressed friction devices 29, to retard independent movement of the attachment.

In practical use our invention has proven very advantageous in facilitating the performance of the work for which it is designed. It is instantaneous in operation, and relieves the operator from the necessity of reaching down into the dome to make his measurements by hand, and consequently he escapes the discomfort which arises from inhaling the noxious fumes given off by the gases contained in the tank.

The provision of the dome 11 enables the tank 10 to be filled to capacity, and permits expansion of the volume of liquid therein under a rise of temperature. The liquid column rising in the dome, is termed "domage", in the industry in connection with which the present invention is employed.

Having thus described our invention, what we claim and desire to secure by Letters Patent of the United States, is:

1. A liquid measuring instrument for tank cars, comprising a staff, a device thereon for indicating either the domage or ullage of the tank, and means slidably connected to said staff for positioning the said device at a zero line after its insertion in the tank.

2. A liquid measuring instrument for tank cars, comprising a staff, a device thereon for indicating either the domage or ullage of the tank, means fixed to said device and slidable on said staff for adjusting the said device at a zero line after insertion in the tank, and a valve for controlling the flow of liquid into the indicating device.

3. A measuring instrument for tank cars, comprising a staff, a device movable thereon for indicating either the domage or ullage of the tank, the said device having means engageable with the shell of the tank to position the device at a zero line after insertion in the tank, and a valve for controlling the flow of liquid into the indicating device.

4. A measuring instrument for tank cars, comprising a staff, a tube slidable vertically on said staff, means for positioning the tube after insertion in the tank at a zero line in the tank, and a valve for controlling the flow of liquid into the tube, to indicate either the domage or ullage of the tank.

5. A measuring instrument for tank cars, comprising a staff for insertion through the dome of the tank, a transparent tube slidably supported thereon, with means for positioning the tube at a zero line after insertion in the tank, and a valve for controlling the flow of liquid into the tube, to indicate either the domage or ullage of the tank.

6. A measuring instrument for tank cars, comprising a staff for insertion through the dome of the tank, a bracket sliding thereon and supporting a glass tube, means for moving the bracket to position the tube at a zero line after insertion in the tank, and a valve for controlling the flow of liquid into the tube, to indicate either the domage or ullage of the tank.

7. A measuring instrument for tank cars, comprising a staff for insertion through the dome of the tank, a domage and ullage indicating device slidable thereon, the said device comprising a tube and a scale associated therewith, means for positioning the tube with the scale at its zero line after insertion in the tank, and a valve for controlling the flow of liquid into the tube.

In testimony whereof, we have signed our names at Milwaukee, this 26th day of April, 1927.

JOHN M. MAYHALL.
HOWARD C. MORRISON.